United States Patent [19]

Li et al.

[11] Patent Number: 5,759,933
[45] Date of Patent: *Jun. 2, 1998

[54] GAS PRESSURE SINTERED SILICON NITRIDE HAVING HIGH STRENGTH AND STRESS RUPTURE RESISTANCE

[75] Inventors: Chien-Wei Li, Livingston, N.J.; John Pollinger, Redondo Beach, Calif.; Jean Yamanis, Morristown; Jeffrey A. Goldacker, Somerville, both of N.J.

[73] Assignee: AlliedSignal Inc., Morris Township, N.J.

[*] Notice: The term of this patent shall not extend beyond the expiration date of Pat. No. 5,100,847.

[21] Appl. No.: 789,699

[22] Filed: Jan. 27, 1997

Related U.S. Application Data

[63] Continuation-in-part of Ser. No. 96,203, Jul. 23, 1993, Pat. No. 5,637,540, which is a continuation of Ser. No. 865,581, Apr. 9, 1991, abandoned, which is a continuation-in-part of Ser. No. 716,142, Jun. 17, 1991, abandoned.

[51] Int. Cl.$^6$ ....................... C04B 35/577; C04B 35/596
[52] U.S. Cl. ........................... 501/92; 501/97.3; 501/97.4
[58] Field of Search ........................... 501/92, 97.3, 97.4

[56] References Cited

U.S. PATENT DOCUMENTS

| | | | |
|---|---|---|---|
| 4,184,882 | 1/1980 | Lange | 501/92 |
| 4,800,182 | 1/1989 | Izaki et al. | 501/92 |
| 5,096,859 | 3/1992 | Sakai et al. | 501/92 |
| 5,100,847 | 3/1992 | Li et al. | 501/97.3 |
| 5,177,038 | 1/1993 | Takahashi et al. | 501/92 |
| 5,312,788 | 5/1994 | Li et al. | 501/92 |
| 5,494,866 | 2/1996 | Li | 501/97.3 |
| 5,637,540 | 6/1997 | Li et al. | 501/92 |

*Primary Examiner*—Karl Group
*Attorney, Agent, or Firm*—Ernest D. Buff

[57] ABSTRACT

A silicon nitride sintered body has a composition consisting essentially of 80 to 93% by weight β silicon nitride, 7 to 20% by weight grain boundary phases consisting essentially of (i) at least two rare earth elements, wherein yttrium is considered a rare earth, and strontium which, calculated as SrO, is 0.5 to 5% by weight, and (ii) at least two of Si, N, O and C; and (c) silicon carbide particulate present in the amount of about 5 to 35 parts by weight per 100 parts by weight of components (a) and (b), said SiC being substantially homogeneously dispersed within said sintered body. Such a ceramic has high strength and long term durability, and is especially suited for industrial applications such as components for gas turbine and automotive engines.

8 Claims, No Drawings

GAS PRESSURE SINTERED SILICON NITRIDE HAVING HIGH STRENGTH AND STRESS RUPTURE RESISTANCE

CROSS-REFERENCE TO RELATED APPLICATIONS

This is a Continuation-In-Part of U.S. application Ser. No. 08/096,203, filed Jul. 23, 1993, now U.S. Pat. No. 5,637,540 which, in turn is a File-Wrapper Continuation of U.S. application Ser. No. 07/865,581, filed Apr. 9, 1992 (now abandoned) which, in turn, is a Continuation-In-Part of U.S. application Ser. No. 07/716,142, filed Jun. 17, 1991, entitled "High Toughness-High Strength Sintered Silicon Nitride" now abandoned.

BACKGROUND OF THE INVENTION

1. Field of the Invention

This invention relates to a sintered silicon nitride ceramic having high fracture toughness, strength, and stress rupture resistance at high temperature, and to a method of manufacturing the same.

2. Description of the Prior Art

Silicon nitride ceramics are well known for their excellent strength at temperature in excess of 1000° C. However, at temperature greater than 1200° C. for the advanced turbine engine applications, few silicon nitride ceramics meet the strength, reliability, and stress rupture resistance requirements. Furthermore, conventional silicon nitride ceramics have fracture toughness typically ranging from 4 to 6 $MPa \cdot m^{0.5}$, and such low toughness makes them susceptible to significant strength degradation from the damage introduced during engine operation. It would be desirable to provide a silicon nitride having fracture toughness greater than 6 $MPa \cdot m^{0.5}$, hence strong resistance to damage, high strength, and strong stress rupture resistance at elevated temperature. Moreover, it would be most desirable to have a silicon nitride material with this combination of excellent properties which can easily be formed into near net shape parts of complex geometry.

Sintering silicon nitride requires sintering aids which form grain boundary phases. Rare earth oxides are effective sintering aids and form refractory grain boundary phases yielding silicon nitride ceramics with good high temperature properties. However, they often require high sintering temperature and/or the application of external pressure for complete densification.

Hot pressing generally produces silicon nitride ceramics with excellent strength properties. U.S. Pat. No. 4,234,343 to Anderson discloses that hot pressed silicon nitride containing different rare earth oxides as sintering aids can have 250 MPa to 550 MPa strength at 1400° C. with smaller rare earth element resulting in higher 1400° C. strength. Ueno and Toibana report in Yogyo-Kyokai-Shi, vol. 9, 409–414 (1983) that hot pressed silicon nitride containing yttria ($Y_2O_3$) in combination with other rare earth oxides exhibits strength of over 600 MPa at 1300° C. U.S. Pat. No. 5,021,372 discloses silicon nitride based ceramic formed by hot pressing having room temperature 4-point bend strength ranging from about 600 to 1200 MPa and fracture toughness greater than 6 $MPa \cdot m^{0.5}$, but the additives used in the fabrication restrict the applications of this silicon nitride to relatively low temperature. Furthermore, it is well known in the field that the process of hot pressing has limited value in the production of structural ceramics because of its shape and size limitations. It is also well known that hot pressing results in a product with anisotropic microstructure and mechanical property undesirable for most applications.

Hot isostatic pressing has the same advantages as hot pressing but without the shape, size, and anisotropy limitations. U.S. Pat. No. 4,904,624 to Yeckley teaches the fabrication of silicon nitride parts containing rare earth sintering aid with flexural strength in excess of 525 MPa at 1370° C. using glass-encapsulated hot isostatic pressing. However, the fracture toughness of this $Si_3N_4$ is only 4 to 5 $MPa \cdot m^{0.5}$. Similarly, U.S. Pat. No. 4,870,036 to Yeh teaches how to fabricate silicon nitride ceramics containing yttria and strontium compound having flexural strength greater than 465 MPa at 1375° C. using hot isostatic pressing, but the fracture toughness of this $Si_3N_4$ is 5 to 6 $MPa \cdot m^{0.5}$. Thus, although hot isostatic pressing can produce silicon nitride ceramics with excellent strength, the fracture toughness of such material is low.

Gas pressure sintering is a manufacturing process for silicon nitride employing moderate nitrogen pressure during high temperature firing. It can be used to fabricate refractory silicon nitride parts without shape and size limitations. U.S. Pat. No. 4,628,039 to Mizutani et al. describes using gas pressure sintering to fabricate silicon nitride ceramics having excellent four-point bending strength at 1300° C. The silicon nitride ceramics contain sintering aids consisting of oxides of two rare earth elements having ionic radii greater and smaller than 0.97 Å respectively, and other minor additives such as oxides of elements from Group IIa of the Periodic Table. U.S. Pat. No. 4,795,724 to Soma et al. describes gas pressure sintered silicon nitride containing at least two kinds of sintering aids, selected from Y, Er, Tm, Yb, and Lu, and having a 1400° C. flexural strength of at least 500 MPa; an example given in this patent shows that a gas pressure sintered silicon nitride ceramic containing $Y_2O_3$ and $La_2O_3$ has a strength of only 230 MPa at 1400° C. No efforts were made in the above identified inventions to fabricate a silicon nitride of unusual microstructure, toughness, flaw tolerance, and stress rupture resistance.

It has been reported that silicon nitride containing 10 to 50% by volume silicon carbide, according to U.S. Pat. No. 3,890,250, and up to 40% by volume silicon carbide, according to U.S. Pat. No. 4,184,882, has improved strength at 1400° C. The ceramics taught by those patentees were prepared by hot pressing and their fracture toughness was not reported.

U.S. Pat. No. 4,800,182 to Izaki et al. discloses a hot pressed silicon nitride/silicon carbide composite fabricated from some special nano-sized Si-N-C powder, with 5 to 30 wt % of silicon carbide, having three-point bending strength of at least 930 MPa at room temperature and fracture toughness (measured by an indentation technique) of 5.3 to 7 $Mpa \cdot m^{0.5}$ depending on the silicon carbide content. However, not only the material requires hot pressing for densification, it should exhibit poor stress rupture resistance property at high temperature because of the low-melting sintering aids used. U.S. Pat. No. 4,814,301 to Steinmann et al. discloses the fabrication of a sintered silicon nitride using crystalline silicates and metal carbides with high retained strength at 1200° C. The strength of those silicon nitride ceramics at 1375° C. will not be high since silicates containing Na, Ca, Mg, Al, and Fe, etc. are used.

U.S. Pat. No. 5,177,038 discloses a sintered $Si_3N_4$ having primarily $Yb_2O_3$, $Y_2O_3$, and SiC as sintering additives, and claims to have high strength at 1400° C. However, this type of material is expected to have poor intermediate temperature oxidation resistance because of the addition of a large quantity of pure rare earth oxide sintering aids which form the grain boundary phases that are known to be associated with the problem.

U.S. Pat. No. 5,523,267 to Tanaka et al. claims a sintered silicon nitride containing up to about 50 wt % silicon carbide of high strength at high temperature. However, stringent purity control to less than 0.5% of Al, Mg, and Ca impurities is required to process the material, and silica additive is used which can make the material difficult to process. Indeed, hot pressing and hot isostatic pressing processes were used in processing the compositions. In addition, one can expect that the fracture toughness of the material is not high because of the large amount of SiC in the sintered body, which significantly reduces the number of the β silicon nitride grains that toughen the material.

SUMMARY OF THE INVENTION

The present invention provides a silicon nitride ceramic of high toughness, strength, and stress rupture resistance that is readily processed into net-shape parts. Such advantageous properties are the direct result of a unique microstructure and composition present in the sintered body. In particular, the silicon nitride ceramic of this invention exhibits fracture toughness greater than 6 MPa·m$^{0.5}$, four-point bending strength greater than 700 MPa at room temperature and 550 MPa at 1370° C., and a stress rupture lifetime greater than 100 hours under a 450 MPa four-point bending stress at 1370° C. The product of this invention is processed using gas pressure sintering, and therefore can be manufactured into complex shapes easily and economically.

According to one aspect of this invention, there is provided a silicon nitride sintered body of at least 97% theoretical density having a composition and a microstructure consisting essentially of:

(a) about 80 to 93 wt % β silicon nitride;

(b) about 7 to 20 wt % grain boundary phases consisting essentially of at least two rare earth elements, wherein yttrium is considered a rare earth, strontium is present in the amount of 0.5 to 5 wt % when calculated as SrO, and at least two of Si, N, O and C are present; and (c) silicon carbide particulate present in an amount ranging from about 5 to 35 parts by weight per 100 parts by weight of components (a) and (b), the silicon carbide being substantially homogeneously dispersed within said sintered body.

According to another aspect of the present invention, there is provided a process for sintering the silicon nitride body at a temperature ranging from about 1500° C. to 2100° C., wherein (a) an initial sintering is carried out at a temperature ranging from about 1500° to 1850° C. for a time greater than one hour but less than eight hours; (b) an intermediate sintering is carried out at temperatures between 1850° and 2000° C. for at least 30 minutes but less than five hours; (c) a final sintering is carried out at temperatures ranging from about 2000° to 2100° C. and for a time ranging from about one to five hours; (d) each of the steps being carried out under nitrogen pressure sufficiently high to avoid decomposition of silicon nitride, and the temperature of the succeeding steps being at least 25° C. greater than that of the previous steps.

According to the last aspect of this invention, there is provided a post sintering heat treatment of this silicon nitride body that preserves its high fracture toughness. This treatment can be a crystallization heat treatment during cooling from the sintering temperature or during a reheating step, or it can be an annealing heat treatment for a silicon nitride containing primarily crystalline grain boundary phases. As a result of this treatment, the grain boundary phases are substantially crystalline and are formed or recrystallized by the annealing. Such post-sintering crystallization or annealing is carried out at temperature of at least 1375° C., preferably of at least 1450° C., and more preferably of at least 1500° C.

According to the present invention, there is provided a silicon nitride ceramic body that has a fracture toughness greater than 6 MPa·m$^{0.5}$, a four point bending strength of at least 700 MPa at room temperature and at least 550 MPa at 1370° C., and a stress rupture lifetime greater than 100 hours under a 450 MPa four-point bending stress at 1370° C. Advantageously, the silicon nitride of this invention is fabricated by a gas pressure sintering process which does not have the shape and size limitations of hot pressing, and which does not require the encapsulation and de-encapsulation steps and the high gas pressure of hot isostatic pressing. The combination of excellent properties and ease of fabrication makes the silicon nitride ceramics of the present invention most suitable for industrial applications such as components for gas turbine and automotive engines and as cutting tools.

DETAILED DESCRIPTION OF THE PREFERRED EMBODIMENTS

Three requirements have to be met concurrently to manufacture a high toughness, high strength (at room temperature and 1370° C.), reliable, and stress rupture resistant silicon nitride ceramic: (1) the grain boundary phase must be refractory so that the 1370° C. strength can be high; (2) the ceramic must be dense and have an optimum microstructure consisting of whisker-like β-Si$_3$N$_4$ grains; and (3) the grain boundary must be weak for sufficient debonding along the grain boundary of the whisker-like β-Si$_3$N$_4$ grain to take place. Details for selecting conditions to manufacture a silicon nitride to meet all these requirements are set forth hereinafter.

In principle, the sintered body of the present invention is formed by sintering a composition comprising (a) silicon nitride, (b) at least two rare earth compounds and a strontium compound as sintering aids, and (c) silicon carbide. In this composition, component (a) should be present in an amount ranging from about 80 to 93 wt %, and component (b) should be present in an amount ranging from about 7 to 20 wt % to make up the 100 percent, and component (c) should be present in an amount ranging from about 5 to 35 parts by weight per 100 parts by weight of components (a) and (b).

The product of this invention should comprise no less than 80 wt % silicon nitride so that the volume fraction of the grain boundary phase is sufficiently low and does not degrade the material's fracture toughness and high temperature properties. In addition, a sufficient number of acicular β silicon nitride grains are present to toughen the sintered body so that it exhibits a fracture toughness greater than 6 MPa·m$^{0.5}$. However, the amount of silicon nitride should be no more than 93 wt % so that the amount of sintering additives is sufficient to sinter the body to at least 97% of the theoretical density.

The product of the present invention is fabricated by adding about 7 to 20 wt % sintering aids which form grain boundary phases. Sintering aids consisting of Y$_2$O$_3$, La$_2$O$_3$, and SrO may be used for enhancing densification. While the two rare earth oxides mentioned are effective sintering aids and are used in the present invention, it is well known in the field that all rare earth oxides can be effective and refractory sintering aids, and may, therefore, be employed to fabricate the product of this invention. One reason for selecting a composition of at least two rare earth compounds and a strontium compound is to reduce the liquidus temperature of the system so that densification and microstructure development can be accomplished by processes other than hot pressing or hot isostatic pressing. Strontium oxide can substantially improve the sintering behavior, enhance microstructure development, and increase the intermediate temperature oxidation resistance of the product of this invention. The amount of strontium added when calculated as SrO should be at least 0.5 wt % to be effective and no greater than 5 wt % so that the high temperature properties are not degraded. Another reason for selecting said composition is that the resultant grain boundary phases have good debonding property and yield ceramics with high fracture toughness.

Another requirement in fabricating the product of this invention is to add SiC into the powder mixture. The amount of SiC should not exceed 35 parts by weight per 100 parts by weight of the total of the silicon nitride powder and the sintering aids to permit full densification using the gas pressure sintering process, and the amount should be at least 5 wt % to be effective. The SiC additive can be crystalline or amorphous, and it can be of the $\beta$ or $\alpha$ type. It can be added as nano-sized, submicron-sized, or micron-sized powder, or introduced via a chemical reaction of a carbon bearing species in gas, liquid or solid state with Si-containing species which eventually forms SiC compound in the silicon nitride ceramics.

The SiC addition improves the strength property through moderation of the grain growth kinetics during sintering thus resulting in a more uniform and finer microstructure, and through the modification of grain boundary properties. During sintering, three possible reactions occur in the product of this invention owing to the addition of SiC. First, SiC can partially dissolve into the liquid phase at sintering temperature and increase the viscosity of the liquid. Second, excess SiC compound particles at grain boundaries can inhibit grain boundary migration. Third, small SiC particles may act as nucleation agents for the growth of $\beta$ silicon nitride grains. The combination of these effects can suppress exaggerated grain growth and result in a more uniform and finer microstructure as compared to the microstructure of a similarly processed silicon nitride which does not contain SiC. This more uniform and finer microstructure affords production of ceramic parts having high strength and high stress rupture resistance. In addition, the SiC particles residing inside the $Si_3N_4$ grains as well as in the grain boundary regions can improve the high temperature stress rupture properties of the sintered body by retarding its creep deformation rate. Incorporating carbon in the grain boundary glassy phase improves its rigidity and as a result the high temperature strength of the sintered silicon nitride improves. Similar effects of carbon on the properties of oxycarbonitride and oxycarbide glasses have been reported by, for instance, J. Homeny et al, J. Am. Ceram. Soc., 70 [5] C114 (1987).

According to this invention, a desirable microstructure and grain boundary property yielding high toughness, high strength, and high stress rupture resistance can be generated by sintering the silicon nitride powder compact of the afore-defined compositions by a special process consisting of at least two temperature steps.

The purpose for the first firing step is to prepare an intermediate ceramic of about 70 to 95% theoretical density comprising a high density of whisker-like $\beta$-$Si_3N_4$ grains of uniform sizes nucleated and grown in situ through the transportation of atoms via vapor and liquid phases. The formation of this intermediate microstructure is possible since the powder compact initially had high pore volume providing room for the $\beta$-$Si_3N_4$ grain to grow along its c axis under the anisotropic surface energy driving force. This incorporation of high density of whisker in the ceramic body can not be achieved by traditional ceramic processing means without problems such as agglomeration and poor green density which translate to sintered parts of poor quality. The firing temperature should be in the range of 1500° to 2000° C. so that the nucleation and growth rates for the whisker-like $\beta$-$Si_3N_4$ grain are adequate. It should not be greater than about 2000° C. because higher temperatures during this step result in exaggerated growth of $Si_3N_4$ grains which can eventually lead to a ceramic body of undesirable microstructure. In addition, the firing time should range from about 1 to 10 hours to allow sufficient amount of whisker-like $\beta$-$Si_3N_4$ grains to develop while controlling grain coarsening so that densification and development of desirable microstructure proceeds.

The intermediate ceramic is then further sintered in the temperature range of 2000° C. to 2100° C. for a time ranging from 1 to 10 hours in order to form a final ceramic body of at least 97% of the theoretical density and to further develop the in-situ grown, whisker-like $\beta$-$Si_3N_4$ grains. A temperature higher than 2000° C. and at least 25° C. higher than that of the first step is selected in order to complete the densification of the ceramic and to generate a large quantity of whisker-like $\beta$-$Si_3N_4$ grains. The temperature is limited to less than 2100° C. because at temperatures in excess of 2100° C. the process of grain coarsening becomes significant and has undesirable effects on the properties. The heat treating time should range from 1 to 10 hours so that sufficient densification and grain growth occur for the desirable microstructure to form.

The sintering and heat treating steps are carried out under elevated pressure of nitrogen gas or of a mixture of $N_2$ with one or more inert gases such as Ar or He. Further, in order to prevent excessive decomposition of silicon nitride during the sintering and heat treating steps, it is preferred that the nitrogen pressure is not less than 3.3, 8, 23, 30 and 50 atm at 1800°, 1900°, 2000°, 2050°, and 2100° C., respectively.

If the silicon nitride fabricated using the conditions described hereandabove is cooled relatively fast from the sintering temperature so that the liquid phase forms glass between the $Si_3N_4$ grains, its microstructure and grain boundary phase property is sufficient to yield a ceramic body with indentation-strength fracture toughness greater than 6 MPa·m$^{0.5}$ and damage resistance properties. However, if the silicon nitride is slow-cooled or heat-treated after the sintering so that it contains primarily crystalline grain boundary phases, the fracture toughness property of said silicon nitride ceramic is found, unexpectedly, to depend strongly on the temperature at which the major crystallization event takes place. If this event takes place either during cooling or in a reheating process at 1375° C. or lower temperatures, the grain boundary property changes which results in significant reduction of fracture toughness. On the other hand, if the major crystallization process takes place at temperatures of at least 1375° C., preferably of at least 1450° C., and more preferably of at least 1500° C., the fracture toughness property remains about the same as that of the silicon nitride ceramic without the crystallization heat treatment. Moreover, we have unexpectedly found that for silicon nitride ceramics which have lost some of their fracture toughness as a result of grain boundary phase crystallization at 1375° C. or lower temperatures, an annealing process at temperatures greater than 1375° C. can restore the material's fracture toughness.

The following is a brief description of a general procedure for manufacturing the final silicon nitride ceramic of the present invention:

First, a homogeneous mixture of powders is formed by known methods. The mixture is prepared by blending and milling powders of (a) $Si_3N_4$ (80 to 93 wt %) and (b) sintering aids (7 to 20 wt %) consisting primarily of compounds of at least two rare earth elements and a compound of Sr, and SiC in an amount of 5 to 35 parts by weight per 100 parts of the total of (a) and (b). Such compounds of rare earth elements are preferably oxides. The powder mixture is then formed into the desired shape by slip casting, cold isostatic pressing, die forming, or other ceramic manufacturing techniques.

The green ceramic body is then fired in the temperature range of 1500° C. to 2100° C., wherein (1) an initial sintering is carried out at temperatures between 1500° and 1850° C. and preferably between 1650° and 1850° C., for a time greater than one but less than eight hours, and preferably greater than 2 but less than 6 hours; (2) an intermediate sintering is carried out at temperatures between 1850° and 2000° C., and preferably between 1900° and 1975° C. for at least 30 minutes but less than five hours, and preferably for at least 60 minutes but less than 3 hours; (3) a final sintering is carried out at temperatures ranging from about 2000° to 2100° C. and preferably from about 2010° to 2050° C. and for a time ranging from about one to five hours and preferably from about 1 to 3 hours; (4) each of the steps being carried out under nitrogen pressure sufficiently high to avoid decomposition of $Si_3N_4$, and the temperature of the succeeding steps being at least 25° C. greater than that of the previous steps.

After completion of the sintering and grain growth process, the $Si_3N_4$ sintered body is cooled relatively fast so that the majority of the grain boundary phase remains amorphous, and then reheated to 1500° C. and held for 10 hours in nitrogen atmosphere to crystallize the grain boundary phase. It can also be cooled down from the sintering temperature in a controlled way so that at least 90% of the grain boundary phase crystallizes at 1500° C. The crystallization temperature should be at least 1375° C., preferably at least 1450° C., and more preferably at least 1500° C., and the crystallization time should be at least one hour. The grain boundary phase can also be crystallized at temperature below 1375° C. first, and then annealed at temperature above 1375° C., preferably at a temperature of at least 1450° C., and more preferably at a temperature of at least 1500° C. After the crystallization treatment, the major grain boundary crystalline phase is the H phase of apatite structure. The other crystalline phases in minor amount are the K, J and melilite phases.

The mechanical properties of the silicon nitride ceramic are readily measured by use of standard tests. In particular, strength measurements are conducted according to the US Military Standard B configuration, which employs a bar of 3 mm by 4 mm by 50 mm, a four-point bend fixture of 20 mm inner and 40 mm and outer spans, and a 5 mm/min loading rate. If the strength measurement is conducted under a three-point bending configuration, then the resultant strength can be at least 10% higher than the four-point bending strength. The stress rupture testing is carried out by applying a constant stress to a specimen loaded under the same 4-point bend configuration mentioned above measurement at an elevated temperature until the specimen fails or testing time reaches 100 hours. The fracture toughness measurement is carried out by diamond polishing the tensile surface of a bend bar down to 1 µm finish, indenting at the middle of the polished surface with a Vickers indenter under 50 Kg load to generate cracks, two of which are parallel to the edges of the bar, and then fracturing the indented bar. The fracture toughness value is calculated using the formula provided by Chantikul et al. (J. Am. Ceram. Society, vol. 64, page 539, 1981).

The following example is presented to provide a more complete understanding of the invention. The specific technique, conditions, materials, proportions and reported data set forth to illustrate the principles and practice of the invention are exemplary and should not be construed as limiting the scope of the invention.

EXAMPLE

The starting compositions for the silicon nitride ceramics used in this example and their sintering conditions are shown in Table 1(a). A raw powder of $Si_3N_4$ (UBE E-10) with alpha content of about 96% having an average grain size of 0.6 µm and a specific surface area of about 10 $m^2/g$ was used. The yttrium oxide ($Y_2O_3$) and lanthanum oxide ($La_2O_3$) were 99% pure having average grain sizes of less than 10 micrometers. Strontium carbonate (99% pure, ~1 µm average size) was used here as the precursor for strontium oxide (SrO): one hundred parts by weight strontium carbonate yields 70 parts by weight SrO. The fine-grade SiC powders used in this example were manufactured by Starck and had average particle sizes of about 0.5 µm. Both the α and β type SiC were used, and the coarse β SiC powder used in this example had an average particle size of about 10 599b 5µm and was made by Superior Graphite.

The green bodies used in this example were fabricated by slipcasting. The formulated powder mixture weighing 1000 g per batch was wet-milled for 24 hours with water and a $Si_3N_4$ grinding media in a polyurethane-lined 1 gallon mill jar. The water's pH level was adjusted to 9.8 by adding $NH_4OH$, and the dispersant added into the water was Darvan C in an amount of about 0.3 wt %. After the milling, the slurry was pressure slip-cast under 40 psi gas pressure into billets of about 2.6"×2.6"×0.8", and dried in a humidity chamber.

The samples in this example were sintered in a graphite resistance furnace using the firing conditions shown in Table 1 (a). The nitrogen pressure used during the firing is sufficiently high to suppress the decomposition of the $Si_3N_4$ samples. The minimum nitrogen pressure required was 10 psi at 1600° C., 50 psi at 1800° C., 150 psi at 1950° C., 300 psi at 2000° C., and 500 psi at 2050° C. X-ray diffraction examinations of the sintered samples listed in Table 1 showed that the major crystalline grain boundary phase in the product of this invention is the H phase having apatite structure, and the secondary crystalline phases are the K, J, and the melilite phases.

TABLE 1(a)

| Sample No. | Si₃N₄ wt % | Y₂O₃ wt % | La₂O₃ wt % | SrO wt % | SiC wt % | Sintering Condition Temp. (°C.)/Time (h)/Max. Pressure (MPa) | Crystallization Temperature |
|---|---|---|---|---|---|---|---|
| 1 | 91.6 | 3.2 | 4.2 | 1 | 5 | 1825/2/0.9 + 1950/3/1.2 + 2015/2/10 | 1450° C./10 h |
| 2 | 88.9 | 5.6 | 4.2 | 1.3 | 11 | 1825/2/0.9 + 1950/3/1.2 + 2015/2/10 | 1500° C./10 h |
| 3 | 88.9 | 5.6 | 4.2 | 1.3 | (11 α SiC) | 1825/2/0.9 + 1950/3/1.2 + 2015/2/10 | 1500° C./10 h |
| 4 | 83.3 | 3.6 | 10.7 | 2.4 | 11 | 1700/2/0.7 + 1950/3/1.2 + 2050/3/10 | 1500° C./10 h |
| 5 | 85.9 | 3.1 | 8.9 | 2.1 | 18 | 1825/2/0.9 + 1950/3/1.2 + 2015/2/10 | 1450° C./10 h |
| 6 | 88.2 | 5.9 | 4.5 | 1.4 | 18 | 1825/2/0.9 + 1950/3/1.2 + 2025/2/10 | 1500° C./10 h |
| 7 | 88.2 | 2.5 | 7.5 | 1.8 | 18 | 1825/2/0.9 + 1950/3/1.2 + 2025/2/10 | 1500° C./10 h |
| 8 | 85.0 | 7.5 | 5.6 | 1.9 | 25 | 1825/2/0.9 + 1950/3/1.2 + 2025/2/10 | 1500° C./10 h |
| 9 | 85.0 | 7.5 | 5.6 | 1.9 | 25 10 μm | 1825/2/0.9 + 1950/3/1.2 + 2025/2/10 | 1500° C./10 h |
| 10 | 84.0 | 3.5 | 10.1 | 2.4 | 33 | 1825/2/0.9 + 1950/3/1.2 + 2015/2/10 | 1500° C./10 h |
| 11* | 92.0 | 4 | 3 | 1 | 0.6 | 1825/2/0.9 + 1950/3/1.2 + 2015/2/10 | 1450° C./10 h |
| 12* | 92.0 | 1.7 | 5.1 | 1.2 | 1 | 1800/2/0.9 + 1950/3/2 + 2000/2/10 | 1500° C./10 h |
| 13* | 92.0 | 1.8 | 5.4 | 0.8 | 2 | 1950/4/2 + 2025/4/8 | 1500° C./10 h |
| | 87.5 | 6.3 | 4.6 | 1.6 | 4 | 1800/2/0.9 + 1950/3/2 + 2000/2/10 | 1500° C./10 h |
| 15* | 88.0 | 2.5 | 7.5 | 2 | 4 | 1975/3.5/2 + 2025/3/10 | 1500° C./10 h |

Note:
*samples outside the scope of this invention

TABLE 1(b)

| | Density % Theo. | Strength (MPa) at 25° C. | Strength (MPa) at 1370° C. | Fracture Toughness MPa · m⁰·⁵ | Stress Rupture Life at 1370° C. |
|---|---|---|---|---|---|
| 1 | 99.6 | 793 | 574 | 7.3 | >100 h/448 MPa |
| 2 | 99.9 | 783 | 653 | 6.9 | >100 h/483 MPa |
| 3 | 99.6 | 783 | 685 | 7.4 | >100 h/483 MPa |
| 4 | 99.1 | 825 | 654 | 7.5 | >100 h/483 MPa |
| 5 | 99.3 | 700 | 638 | 6.2 | >100 h/483 MPa |
| 6 | 99.4 | 784 | 632 | 7.0 | >100 h/483 MPa |
| 7 | 99.8 | 857 | 660 | 7.3 | >100 h/483 MPa |
| 8 | 99.5 | 768 | 690 | 6.4 | >100 h/483 MPa |
| 9 | 99.6 | 754 | 668 | 6.4 | >100 h/483 MPa |
| 10 | 99.0 | 752 | 601 | 6.4 | >100 h/483 MPa |
| 11* | 99.6 | 758 | 572 | 8.3 | 12 h/448 MPa |
| 12* | 99.5 | 800 | 550 | 8.4 | 0.5 h/414 MPa |
| 13* | 99.5 | 780 | 560 | 8.7 | 0.1 h/414 MPa |
| 14* | 99.6 | 820 | 580 | 7.6 | <0.1 h/448 MPa |
| 15* | 98.7 | 847 | 449 | 7.5 | <0.1 h/448 MPa |

It can be seen from Table 1 that sample Nos. 1 to 10, which were fabricated according to the teaching of this invention, show a room temperature strength of at least 700 MPa and a 1370° C. strength of at least 550 MPa. Comparing the properties of those products of the present invention with the comparison sample Nos. 11–15, which are samples of compositions and processing methods outside the scope of this invention, one can see that sample Nos. 1 to 10 show much improved high temperature strength and stress rupture resistance at 1370° C. As one can see from the results shown in Table 1(b), the stress rupture lifetimes for sample Nos. 1 to 10 are greater than 100 hours under a 448 MPa four-point bending stress at 1370° C., whereas sample Nos. 11–15 fractured in much shorter times under the same stress or even lower stress levels.

As a comparison, it was disclosed in U.S. Pat. No. 4,904,624 that a hot-isostatic-pressed silicon nitride containing 4 wt % yttria having a stress rupture lifetime greater than 100 hours under 350 MPa at 1370° C. Another comparison example can be found in the paper published in J. Mater. Sci., 25, 4361 (1990), where one could find that the stress-rupture resistance of conventional silicon nitride ceramics are much poorer compared with the product of this invention. Such improvement is due to the composition and microstructure of the product of the present invention which can significantly enhance the resistance to slow crack growth and creep damage at high temperatures.

The strength and stress rupture data presented in Table 1(b) were acquired using 4-point bending and bars according to the US Military Type B standard. If a 3-point bending configuration or a smaller inner span were used, then the measured strength for the product of this invention would be much higher than what is shown in Table 1(b). Similarly, the stress rupture performance would be much higher than what is demonstrated in Table 1(b) if 3-point bending or a smaller span were used.

Moreover, the material of this invention exhibits a fracture toughness of at least 6 MPa·m$^{0.5}$. This toughness value is high compared to those conventional silicon nitride ceramics. The high fracture toughness for the product of this invention is achieved by the formulation and the sintering process disclosed in the present invention, which are especially effective in creating long acicular β silicon nitride grains that increase the fracture toughness, and in enhancing debonding along the interface of the silicon nitride grains. As a result, even with a high concentration of SiC in the product, its fracture toughness can still be >6 MPa·m$^{0.5}$.

The fracture toughness reported in Table 1(b) was obtained using the indentation strength in bending technique. However, other common techniques, such as the indentation technique reported in J. Mater. Sci. Lett., 1982, vol. 1, pp. 13–16 can also be used to evaluate the toughness property. By using a 20 kg Vickers indentation load, the fracture toughness measured by that technique for the product of this invention listed in Table 1(b) fall in the 7 to 9.5 MPa·m$^{0.5}$ range. That is, the fracture toughness values measured by the indentation technique can be at least 5% higher than those reported in Table 1(b).

The excellent properties for the product of this invention can be achieved using either β or α SiC as the starting powder. This is illustrated by sample No. 3 which was manufactured by using α SiC powder. In addition, coarse SiC powder can also be used to fabricate the product of this invention, as is demonstrated by sample No. 9 which was manufactured using a commercial SiC having an average particle size of about 10 μm.

It has been found that the fracture toughness for the material of this invention is dependent on the crystallization temperature. In addition, it has been found that the material's fracture toughness is low if the amorphous grain boundary phase in the sintered material is crystallized at a temperature lower than 1375° C. Therefore, the product of this invention should be crystallized at temperature of at least 1375° C., preferably at least 1450° C., and more preferably at a temperature of at least 1500° C.

Having thus described the invention in rather full detail, it will be understood by those skilled in the art that such detail need not be strictly adhered to but that various changes and modifications may suggest themselves to one skilled in the art, all falling within the scope of the present invention as defined by the subjoined claims.

What is claimed is:

1. A silicon nitride sintered body having a composition consisting essentially of:
   (a) about 80 to 93% by weight β silicon nitride;
   (b) about 7 to 20% by weight grain boundary phases consisting essentially of at least two rare earth elements, wherein yttrium is considered a rare earth, strontium in the amount of 0.5 to 5% by weight when calculated as SrO, and at least two of Si, N, O and C;
   (c) silicon carbide particulate present in the amount of about 5 to 35% by weight per 100 parts by weight of components (a) and (b), said silicon carbide being substantially homogeneously dispersed within said sintered body, said sintered body having a density of at least 97% of the theoretical.

2. A silicon nitride sintered body as recited by claim 1, wherein yttrium is one of the two rare earth elements.

3. A silicon nitride sintered body as recited by claim 1, wherein one of the said two rare earth elements is yttrium present in an amount ranging from 2 to 8 wt % when calculated as yttrium oxide, and the other rare earth element is lanthanum present in an amount ranging from 4 to 11 wt % when calculated as lanthanum oxide.

4. A silicon nitride sintered body as recited by claim 1, wherein the said grain boundary phases are substantially crystalline and are formed or recrystallized by annealing at temperatures of at least 1375° C.

5. A silicon nitride sintered body as recited by claim 4, wherein greater than 50% of said crystalline phases is the H phase with apatite structure.

6. A silicon nitride sintered body having a composition consisting essentially of:
   (a) about 82 to 92% by weight β silicon nitride;
   (b) about 8 to 18% by weight grain boundary phases primarily consisting of (i) at least two rare earth elements, one of which is yttrium, and Sr ranging from 1 to 2.5% by weight when calculated as SrO, and (ii) at least two of Si, N, O, and C; and
   (c) silicon carbide particulate ranging from about 5 to 35 parts by weight per 100 parts by weight of components (a) and (b), said SiC being substantially homogeneously dispersed within said sintered body, and said sintered body having a density at least 97% of theoretical.

7. A silicon nitride sintered body as recited by claim 1 or 6, said body having been sintered by a process consisting of firing in the temperature range of 1500° C. to 2100° C., wherein:
   (a) an initial sintering is carried out at a temperature between 1500° and 1850° C. for a time greater than one but less than eight hours;
   (b) an intermediate sintering is carried out at a temperature between 1850° and 2000° C. for at least 30 minutes but less than five hours;
   (c) a final sintering is carried out at a temperature ranging from about 2000° to 2100° C. for a time ranging from about one to five hours;
   (d) each of the steps being carried out under nitrogen pressure sufficiently high to avoid decomposition of silicon nitride, and the temperature of the succeeding steps being at least 25° C. greater than that of the previous steps.

8. The silicon nitride sintered body of claim 1, wherein said sintered body has a room temperature four-point bending strength of at least 700 MPa and a 1370° C. strength of at least 550 MPa, and a stress rupture lifetime of at least 100 hours under a 450 MPa four-point bending stress at 1370° C., and a fracture toughness of at least 6 MPa·m$^{0.5}$.

* * * * *